(12) United States Patent
Armitage et al.

(10) Patent No.: US 10,579,502 B2
(45) Date of Patent: Mar. 3, 2020

(54) RESUMING APPLICATIONS USING PASS-THROUGH SERVERS AND TRACE DATA

(71) Applicant: International Business Machines Corporation, Armonk, NY (US)

(72) Inventors: Joshua H. Armitage, Westminster (AU); Michael P. Clarke, Nedlands (AU); John A. Kaputin, Rockingham (AU); King-Yan Kwan, Perth (AU); Andrew Wright, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 15/444,756

(22) Filed: Feb. 28, 2017

(65) Prior Publication Data
US 2018/0246786 A1    Aug. 30, 2018

(51) Int. Cl.
*G06F 11/36*    (2006.01)

(52) U.S. Cl.
CPC ................. *G06F 11/3636* (2013.01)

(58) Field of Classification Search
None
See application file for complete search history.

(56) References Cited

U.S. PATENT DOCUMENTS

| | | |
|---|---|---|
| 6,854,108 B1 | 2/2005 | Choi |
| 8,370,841 B2 | 2/2013 | Subhraveti et al. |
| 8,539,434 B2 | 9/2013 | Vertes |
| 8,578,340 B1 * | 11/2013 | Daudel ............... G06F 9/45504 710/266 |
| 9,223,611 B2 | 12/2015 | Kekeh et al. |
| 9,323,647 B2 | 4/2016 | Gebhardt et al. |
| 2011/0088043 A1 * | 4/2011 | Lind ...................... G06F 8/315 719/316 |

(Continued)

FOREIGN PATENT DOCUMENTS

WO    2006077260 A1    7/2006

OTHER PUBLICATIONS

Aliaksandra Sankova, "Record and Replay of Multithreaded Applications", Abstract, Jul. 2015, 21 pages.

(Continued)

*Primary Examiner* — Daxin Wu
(74) *Attorney, Agent, or Firm* — Cantor Colburn LLP; William Kinnaman

(57) ABSTRACT

Aspects include receiving, at a pass-through server executing in a replay mode, a request directed to a backend resource. The request is received from an application that is connected to the pass-through server. The pass-through server executing in the replay mode identifies a response that corresponds to the request by: forming a key that includes an identifier of the current execution phase of the application and at least a subset of the request; accessing trace data that includes a plurality of keys and corresponding responses that were previously recorded in the trace data by the pass-through server executing in a recording mode; and using the key to locate, in the trace data, the response corresponding to the request. The identified response is relayed, by the pass-through server executing in the replay mode, to the application.

20 Claims, 7 Drawing Sheets

(56) References Cited

U.S. PATENT DOCUMENTS

2014/0237293 A1* 8/2014 Cui ................... G06F 11/3466
714/37

OTHER PUBLICATIONS

Ekaterina Itskova, "Echo: A deterministic record/replay framework for debugging multithreaded applications", Imperial College, London, Jun. 14, 2006, 81 pages.

* cited by examiner

RESUMING APPLICATIONS USING PASS-THROUGH SERVERS AND TRACE DATA

BACKGROUND

This disclosure relates generally to resuming applications, and more specifically, to resuming applications using pass-through servers and trace data.

SUMMARY

According to embodiments, a method, system, and computer program product are provided for resuming applications using pass-through servers and trace data. A method includes receiving, at a pass-through server executing in a replay mode, a request directed to a backend resource. The request is received from an application that is communicatively coupled to the pass-through server. The pass-through server executing in the replay mode identifies a response that corresponds to the request by: forming a key that includes an identifier of the current execution phase of the application and at least a subset of the request; accessing trace data that includes a plurality of keys and corresponding responses that were previously recorded in the trace data by the pass-through server executing in a recording mode; and using the key to locate, in the trace data, the response corresponding to the request. The identified response is relayed, by the pass-through server executing in the replay mode, to the application.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
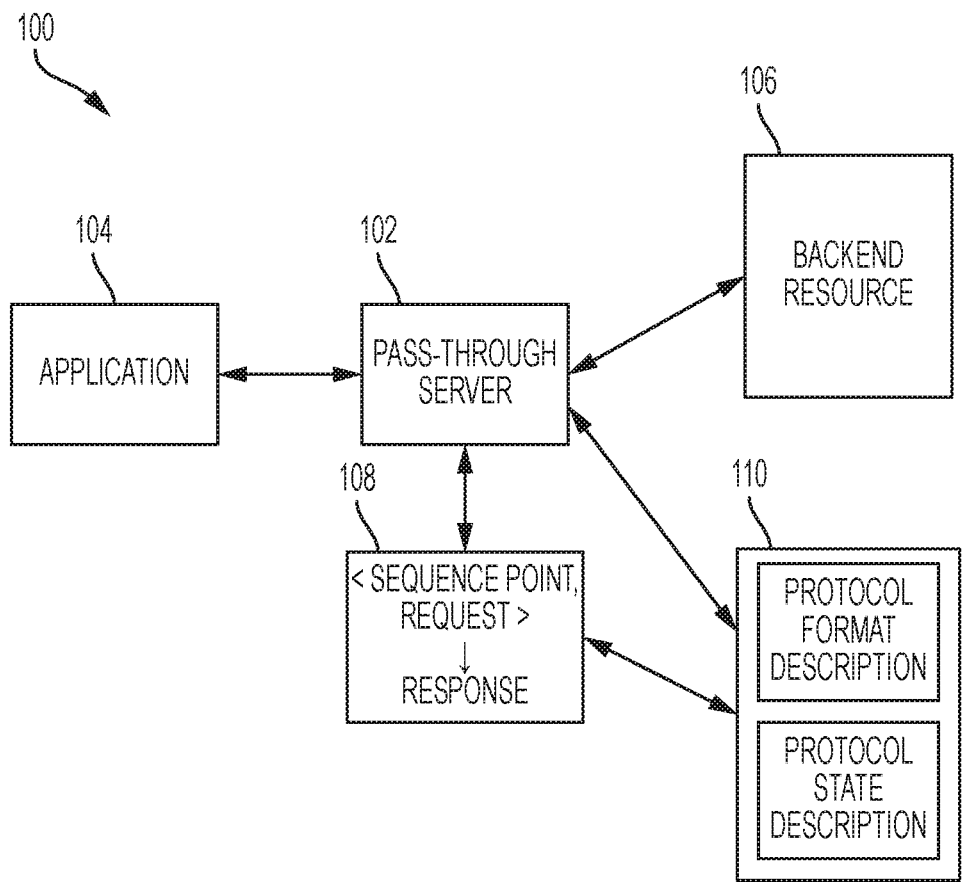
FIG. 1 depicts a block diagram of a pass-through server operating in a recording mode in accordance with one or more embodiments.

One or more embodiments described herein are directed to resuming applications using pass-through servers and trace data. In accordance with one or more embodiments, application trace data is recorded in a way that can be replayed while accounting for multiple threads, multiple processes, and multiple connections to and from application resources. Applications can be replayed from the start using trace recordings in different combinations of execution sequences and resources. In addition, applications can be replayed using trace recordings to resume execution at an intermediate state, including the ability to rewind back to an intermediate state.

In accordance with one or more embodiments, a pass-through server records application request/response cycles (e.g., a request and its corresponding response) and pairs them to sequence points. Sequence points identify a particular execution phase of the application, and can be used to handle multitasked applications and to represent expected state changes. In addition, protocols can be externally described in other formats which are used by a pass-through server to implement request masking and matching. Multiple pass-through servers can be used to provide isolation between separate endpoints in an application server or micro-service environment. The pass-through server then uses previously recorded requests and corresponding responses to emulate the resource and replay responses to application requests.

In accordance with one or more embodiments, to replay responses that were recorded from multiple threads, neither the pass-through server nor the application needs to keep track of which thread made a particular request during the recording of the request and corresponding response. They also don't need to keep track of which thread makes the earlier request because the order of sequence points, denoting phases of execution, is set by the application itself. Embodiments of the pass-through server described herein use a request/response abstraction for everything (e.g., every operation that goes to a separate component), so it is applicable in many environments, not just for network applications. In accordance with one or more embodiments, the only requirement is that requests are representable in a form that can be compared for matching purposes in replay mode. In this way, the pass-through server isn't tied to any protocol but can be easily extended to incorporate multiple protocols.

Applications do not need to be redesigned to take advantage of the replay capabilities provided by one or more embodiments described herein. In addition, applications execute in the same manner whether the data is coming from the backend resource when the pass-through server is in recording mode or from the trace data when the pass-through server is in replay mode. In accordance with one or more embodiments, applications can be augmented with calls to the pass-through server to set active sequence points. In addition, several pass-through servers can easily be combined in a composition that makes sense for an application rather than forcing an application to be implemented in any particular manner. Composability can make it easy to implement a multistage replay where an application is resumed in large steps without going through all of the initialization, with the possibility of resuming components in combinations of different states from various pre-recordings.

In accordance with one or more embodiments described herein, trace data generated by an application is used to restore the application to a known state and execution phase, thus avoiding a complete initialization and rerun of the application (and the additional time and resources required). Trace information can be represented in many different formats and there can be many levels of trace data at different levels of completeness of information. An application may have many components (e.g., databases, web servers) running concurrently, with each able to generate their own traces, so resuming an entire application from anything less than a hibernation requires some way for the trace information to reconstruct all the different components of the application. One or more embodiments of the pass-through server described herein can be used to reconstruct the different components of an application.

Unit testing of an application with code coverage can require mock data, mock objects, and even mock systems that are used to provide simulated data to test valid and erroneous states of the components being tested. The amount of code covered by unit testing can depend on backward and forward compatibility, and in a complex application there may be too many different combinations such that manually creating mock data/objects to provide a high percentage of coverage is not feasible. In accordance with one or more embodiment described herein, coverage can be improved by writing code tests and generating the mock data/objects/systems during an initial run of the code tests (e.g., when the pass-through server is in record mode).

Some software defects, or bugs, can only be recreated when executing an application in the same manner that it is run in production, and unit tests (or small scale integration tests) may not trigger the necessary conditions to recreate the bug. In addition, it is often not feasible to maintain (or mock out) old versions of systems, however complete testing of an application may require limited tests to be run against the old versions of systems. Further, some applications may be harder to unit test because of the stateful nature (e.g., database resources in the middle of a transaction) of the program design. These types of applications are often not unit tested due to these issues. One or more embodiments described herein can provide an intermediate solution for these types of applications where units can be isolated for test while the application is being redesigned or refactored to be more amenable to unit testing. In addition, one or more embodiments described herein can be used to optimize testing so that intermediate stages of a test can be mocked and combined such that other tests can run from that intermediate stage.

One or more embodiments described herein do not rely on the use of network application level protocols as is commonly the case when network replay tools are utilized. As known in the art, there are commonly used protocols that are based on Hypertext Transfer Protocol (HTTP) as well as protocols that have been custom developed with different execution flows. A problem with using network replay tools has to do with them recording network communications at a lower level (e.g., TCP packets), which makes the replay of an application difficult as the tools may not understand application requirements such as, but not limited to: sessions, handshakes, and timing/coordination requirements.

As used herein, the term "application" refers to any group of computer instructions that can execute and that's not necessarily a stand-alone executable (e.g., it is a single executable binary) such as, but not limited to: an application in a production environment; a test harness that runs a part of, or a whole, application in a self-contained environment; or an application server/container itself.

As used herein, the term "backend resource" refers to any resource that an application sends a request to and expects a corresponding return from including, but not limited to: a database, a web server, a micro-service endpoint, an application programming interface (API) implementation, and a message queue or other inter-process communication (IPC) mechanism.

As used herein, the term "sequence point" refers to a string of bytes with no restricted format that acts as the name, or identifier, for the current phase of execution in the application. The pass-through server does not impose a sequence point naming scheme as the naming scheme is decided by the application to suit its needs. In accordance with one or more embodiments, the combination of a sequence point and a request is unique and is used to create a unique key. In accordance with one or more additional embodiments, the combination of a sequence point and a subset of the request is unique and is used to create a unique key.

As used herein, the term "pass-through server" refers to a self-contained service that resides between the application and a backend resource. When the pass-through server is executing in a recording mode, it relays requests from an application to a backend resource and then records the results returned from the backend resource along with the current sequence point of the application in a trace file. When the pass-through server is executing in a replay mode, it accesses the trace file to determine a response to a request from the application that is directed to the backend resource. The application can be started at the beginning of the application or resumed at an intermediate point when the pass-through server is executing in replay mode. In both the recording and replay modes the pass-through server relays the response back to the application.

As used herein, the term "trace data" refers to data collected by the pass-through server when it is in record mode. The trace data can be stored in a trace database with each record including an identifier of the current execution phase of the application (e.g., the sequence point), a request from an application, and the corresponding response. In accordance with one or more embodiments, the identifier of the current execution phase of the application and the request from the application are combined to form a unique key into the trace database. The trace data can be stored in manner known in the art including being stored in a database and being stored in an indexed file.

Turning now to FIG. 1, a block diagram 100 of a pass-through server 102 operating in a recording mode is generally shown in accordance with one or more embodiments. The block diagram 100 of FIG. 1 includes the pass-through server 102, an application 104, a trace database 108 (or other storage location for trace data), a backend resource 106, and protocol description database 110 (or other storage location for protocol description data). In accordance with one or more embodiments, the pass-through server 102 acts as a transparent intermediary between the application 104 and the backend resource 106. The application 104 sends a request to the backend resource 102, and the pass-through server 102 retains a copy of the request and relays the request to the backend resource 106. The resource 106 returns a response to the pass-through server 102, which relays the response back to the application 104. The application server 104 can also record the request and corresponding response and save it to the trace database 108 along with the currently a currently active sequence point which identifies a current execution phase of the application 104. The combination of the active sequence point and the request can serve as the unique key with which to retrieve the correct corresponding response in replay mode as described below.

In accordance with one or more embodiments, when in the recording mode, the pass-through server 102 records requests and corresponding responses exactly as received. In accordance with one or more other embodiments, the pass-through server 102 applies masking and other specialized matching rules when in recording mode. Masking and matching rules can be used to relax the matching criteria from a strict byte-for-byte equality. For example, date/time headers in HTTP, or user ids may be masked so that replay can proceed without irrelevant errors As shown in FIG. 1 protocol format descriptions (e.g., Abstract Syntax Notation One or "ASN.1) are stored in the protocol description database 110. The protocol format descriptions are provided for the pass-through server 102 to provide masking rules. For example, a binary-header protocol may be described by something like ASN.1 and textual protocols by a version of a Backus normal form (BNF). The pass-through server 102 can use the binary-header protocol to determine which field should be masked and how to mask those fields. For a protocol like HTTP, it may be a simple regular expression to mask out say, a date header field. These protocol format descriptions only need to cover the parts of the protocol that are used and provide a much simpler description for greater clarity in the context of the application or development environment. In accordance with one or more embodiments, a Java™ Remote Method Invocation (RMI) protocol is implemented by Java serialized objects and can be used in this capacity as a protocol description.

As shown in FIG. 1 protocol state descriptions are also stored in the protocol description database 110. Complex protocol states (e.g., protocols which may not have a 1:1 request to response ratio, or protocols with various handshakes) can be described as a state machine such as Petri Net Markup Language (PNML). Complex protocol states can also be implemented as a separate control program that renames, masks, or generates new sequence points in response to the state of the request/response cycle in the pass-through server 102.

In accordance with one or more embodiments, the application 104 runs as originally coded, but is augmented with calls to the pass-through server 102 to set active masks and the active sequence point. The application 104 is the entity with the knowledge of what it constitutes as a phase of execution. For example, the application 104 may display a list of datasets, delete a dataset mentioned in the list, and then redisplay the list of datasets. This can constitute two phases of execution. First, the application 104 sets a sequence point for getting the initial list of datasets. Then, the application 104 sets a new sequence point when it deletes a dataset and refreshes the list. The request to display the list of datasets should be exactly the same for both requests, but because the state of the host has changed, the application 104 expects a different response. Even if the response is the same, there is no change to logic for the application 104 to set a new sequence point anyway. If the application 104 follows a well-defined sequence of operations, the logic can be offloaded to a protocol state machine description or control program to simplify the interaction of the application 104 with the pass-through server 102.

Figure 2:
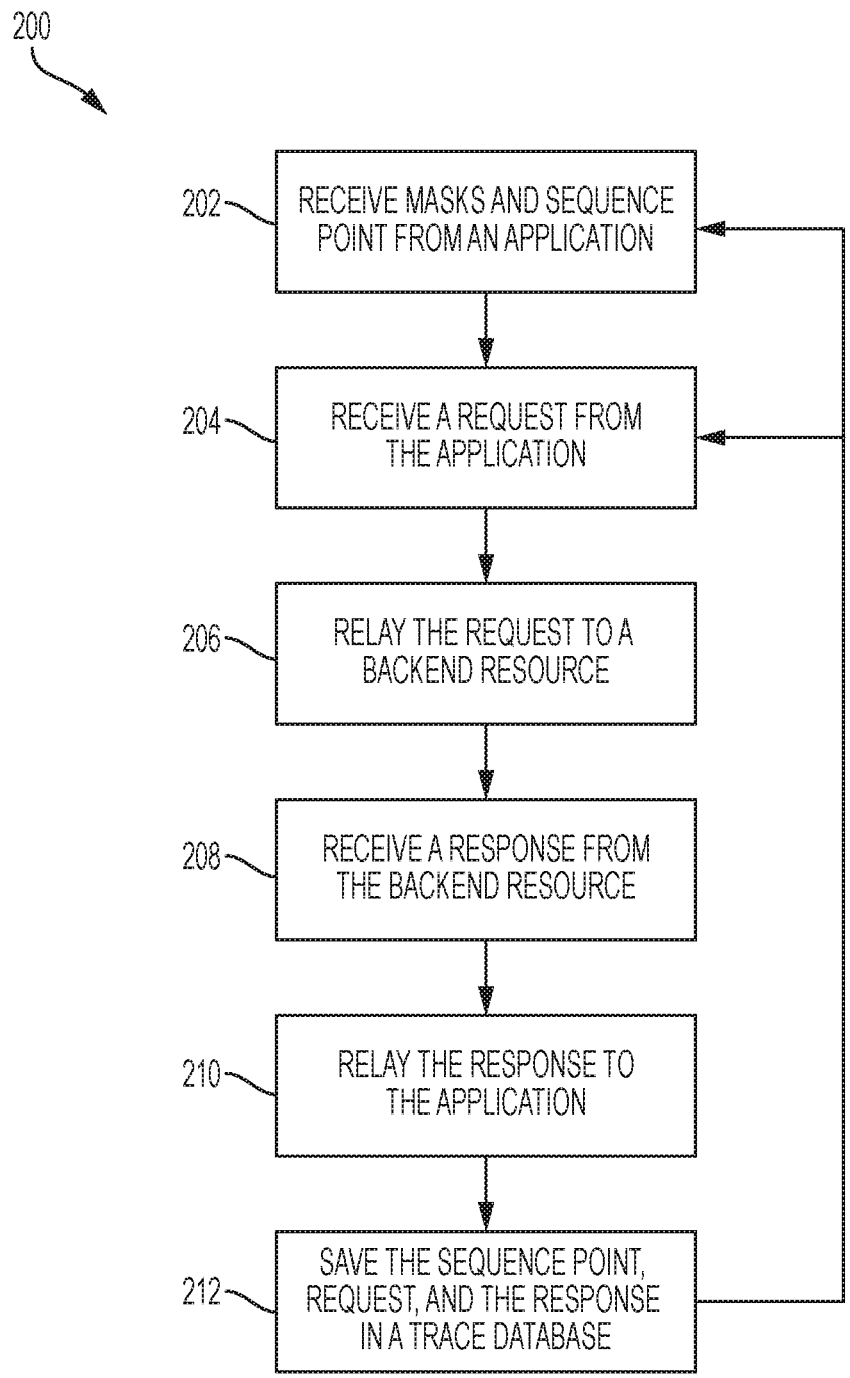
FIG. 2 depicts a process flow of a pass-through server operating in a recording mode in accordance with one or more embodiments.

Turning now to FIG. 2, a process flow 200 of a pass-through server operating in a recording mode is generally shown in accordance with one or more embodiments. In an embodiment, the processing shown in FIG. 2 is implemented by the pass-through server 102 shown in FIG. 1. At block 202, masks and a sequence point which identifies a phase of execution of an application (e.g., application 104 of FIG. 1) is received from the application 104. The masks can be used to replace transient fields (like a HTTP date header) in a request such that the pass-through server can still find the correct response to relay back to the application at a future time.

At block 204, a request is received from the application 104, and at block 206, the request is relayed to the backend resource specified by the request (e.g., backend resource 106 of FIG. 1). A response is received back from the backend resource 106 at block 208, and at block 210 the response is relayed to the application 104. Block 212 is performed to save the sequence point, request, and response in a trace database (e.g., trace database 108 on FIG. 1). Processing can continue at block 204 with another request at the same sequence point being received from the application 104. Alternatively, processing can continue at block 202 with a new sequence point and/or new masks being received by the pass-through server 102.

Figure 3:
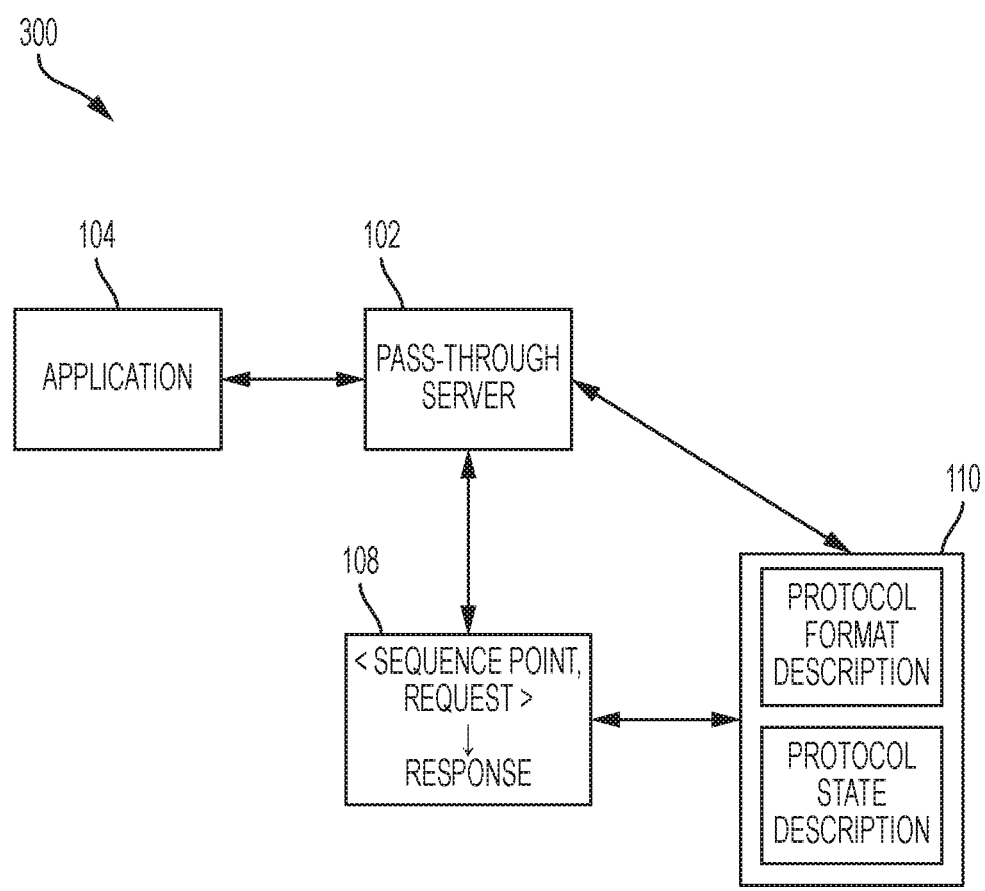
FIG. 3 depicts a block diagram of a pass-through server operating in a replay mode in accordance with one or more embodiments.

Turning now to FIG. 3, a block diagram 300 of a pass-through server operating in a replay mode is generally shown in accordance with one or more embodiments. The block diagram 300 of FIG. 3 includes the pass-through server 102, the application 104, the trace database 108 (or other storage location for trace data), and the protocol description database 110 (or other storage location for protocol description data). In replay, or playback, mode, when the pass-through server 102 receives a request, applies the currently active masks to the request (and possibly the sequence point). It searches the recorded trace database 108 for a matching sequence point and request, and sends the matching response back to the application 104.

From the point of view of the application 104, there is no change in logic needed whether the response is coming from the backend resource or from the trace data. The application 104 sets masks and sequence points in the same sequence whether the pass-through server 102 is recording or replaying. In the case of resuming the application 104 to a known state and then continuing execution with an actual backend resource, this can be implemented as part of the protocol state description used by the pass—through server 102 or by a separate state program, that reconnects to the backend resource and continues operation in the same recoding mode as shown in FIG. 1.

Figure 4:
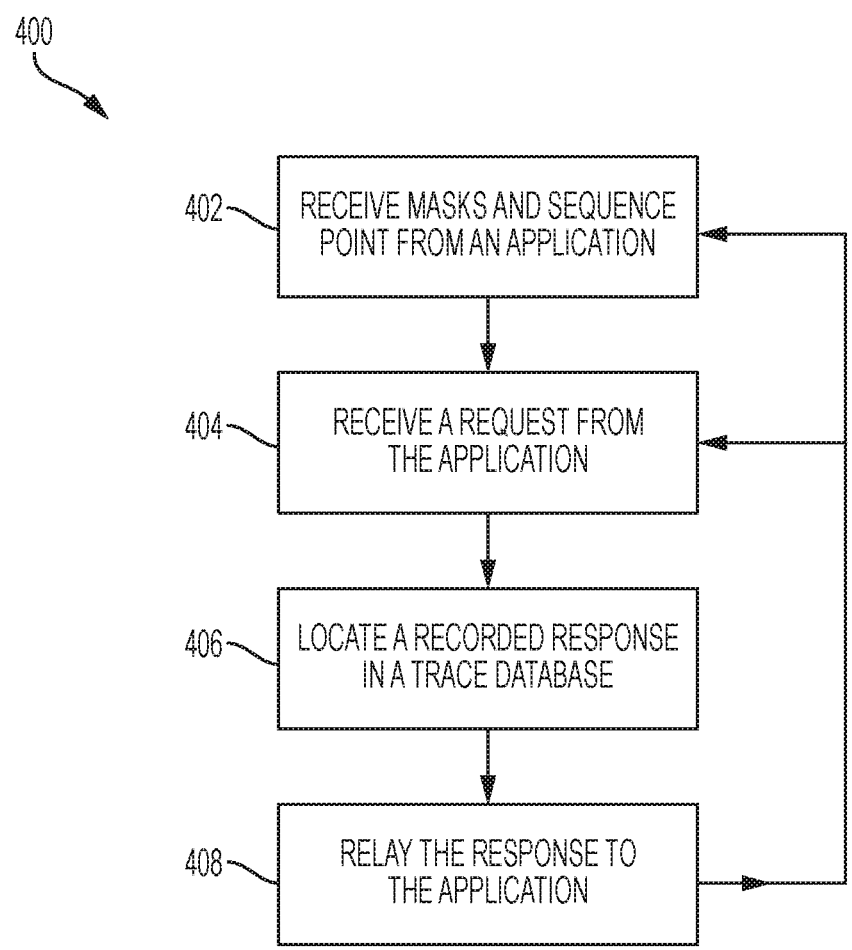
FIG. 4 depicts a process flow of a pass-through server operating in a replay mode in accordance with one or more embodiments.

Turning now to FIG. 4, a process flow 400 of a pass-through server operating in a replay mode is generally shown in accordance with one or more embodiments. In an embodiment, the processing shown in FIG. 4 is implemented by the pass-through server 102 shown in FIG. 3. At block 402, masks, and a sequence point which identifies a phase of execution of an application (e.g., application 104 of FIG. 4) is received from the application 104. At block 404, a request is received from the application 104, and at block 406, a record that includes the corresponding response is located in the trace database 108. In accordance with one or more embodiments, the trace database 108 is searched for a record with a key that matches the sequence point and the request. The response from the record with the matching key is relayed to the application 104 at block 408. Processing can continue at block 404 with another request at the same sequence point being received from the application 104. Alternatively, processing can continue at block 402 with a new sequence point and/or new masks being received by the pass-through server 102.

Figure 5:
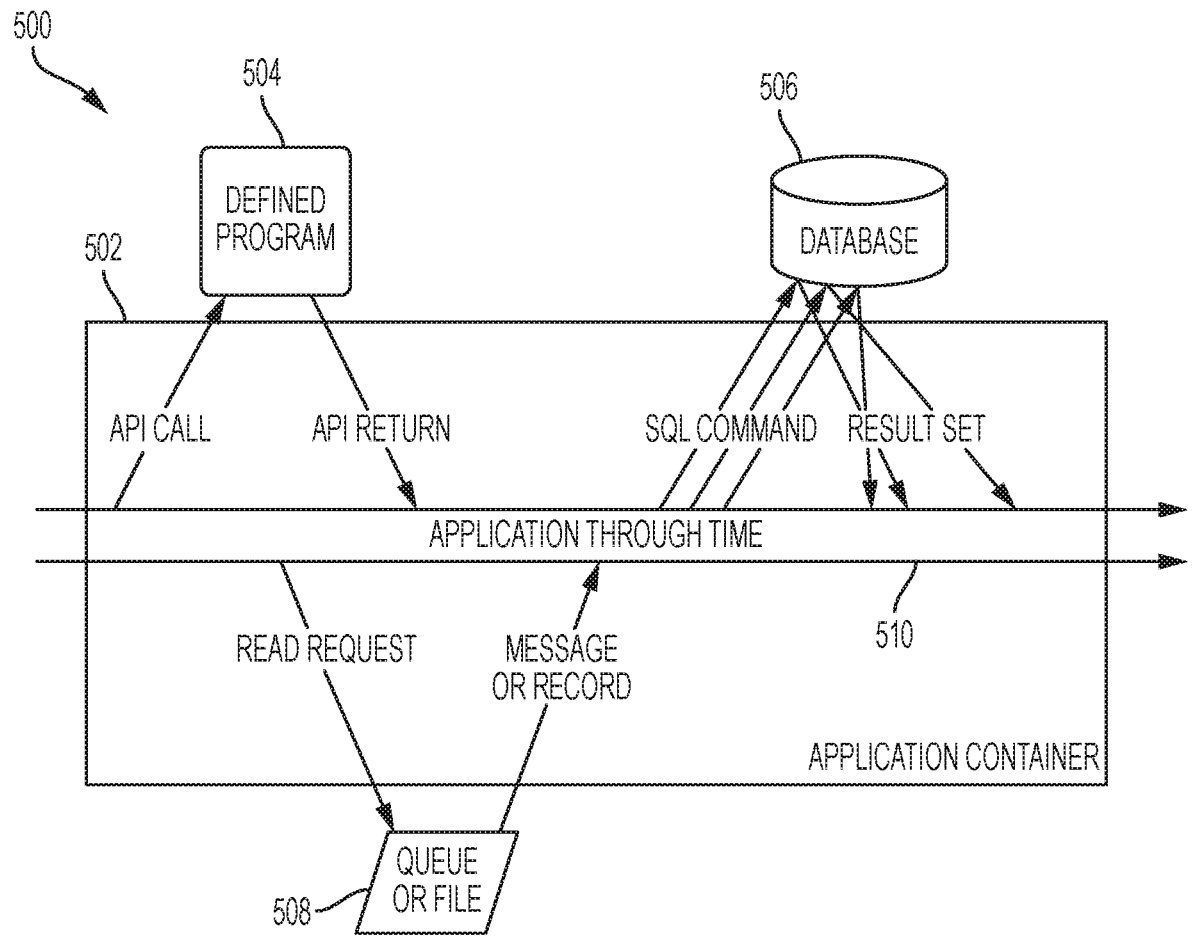
FIG. 5 depicts a block diagram of an application that coordinates multiple backend resources in accordance with one or more embodiments.

Turning now to FIG. 5, a block diagram 500 of an application that coordinates requests to multiple backend resources is generally shown in accordance with one or more embodiments. FIG. 5 depicts the processing flow from the point of view of an application inside an application server, an application as a cloud application, a transaction manager, and/or or an application with a complex concurrent/parallel control flow. In the embodiments shown in FIG. 5, instead of having a separate program to coordinate multiple pass-through servers, the application itself is the coordination program. This can simplify both the pass-through server implementation and the application. In accordance with one or more embodiments, for abstracting API calls (or writes to shared memory, for example), the protocol description is in terms of register/stack calling conventions and memory layout of objects. Aspect-oriented programming patterns can also be used to intercept API calls to treat them as request/responses.

The block diagram 500 of FIG. 5 includes an application container 502 and shows the flow of an application through time 510. As shown in FIG. 5, the backend resources include a defined program 504, a database 506, and a queue (or file) 508. The application, via the application container 502, issues an API call to the defined program 504 and receives an API return in response to the API call. The application also sends a read request to the queue (or file) 508, and receives a message (or record) back in response. The application also sends structured query language (SQL) commands to the database 506 and receives results sets back from the database 506.

In one configuration, the application container may instantiate pass-through servers for each backend resource 504, 506, 508. All sequence points and masks are applied, and requests and responses are recorded and relayed by each pass-through server as the application runs. In another configuration, an application container may simply use one pass-through server for all of the backend resources 504, 506, 508.

Figure 6:
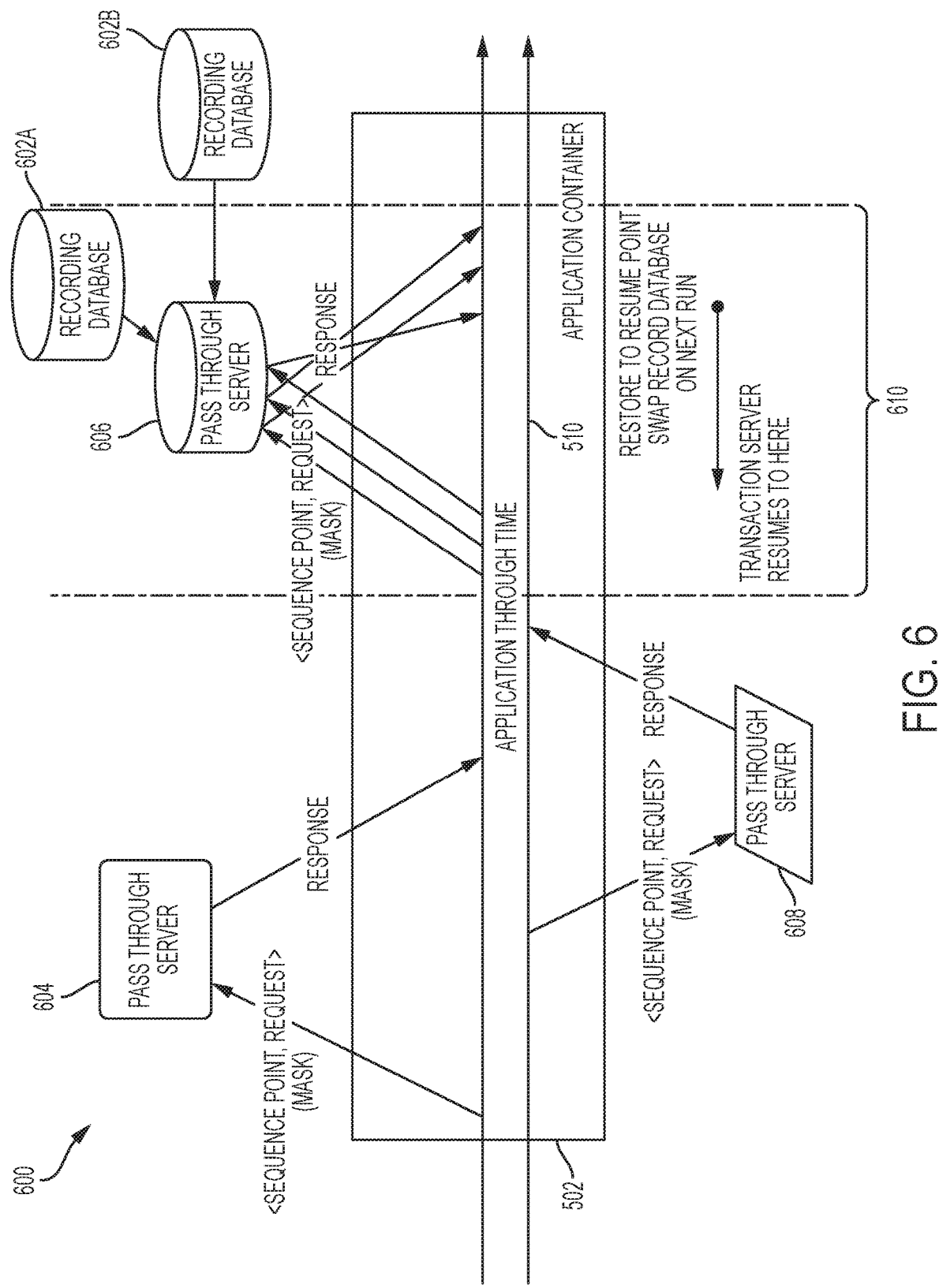
FIG. 6 depicts a block diagram of the application of FIG. 5 with pass-through servers in accordance with one or more embodiments.

Turning now to FIG. 6, a block diagram 600 of the application of FIG. 5 with pass-through servers is generally shown in accordance with one or more embodiments. As shown in FIG. 6, the application can define its backend resources through name schemes such as, but not limited to Java Naming and Directory Interface (JNDI). As shown in FIG. 6, the application container 502 can easily swap in pass-through servers 604 608 606 or different recording databases 602A-B containing different trace data. A test harness application can take advantage of this to run tests in a combinatorial manner. Many unit tests work from a common intermediate state. For example, a test suite may want to test all the runtime conditions that may arise at a certain point in a multi-phase operation. Instead of having to start a test from the beginning, the test harness, using one or more embodiments described herein, can just rollback 610 to a particular sequence point and run the test from that point onwards.

Figure 7:
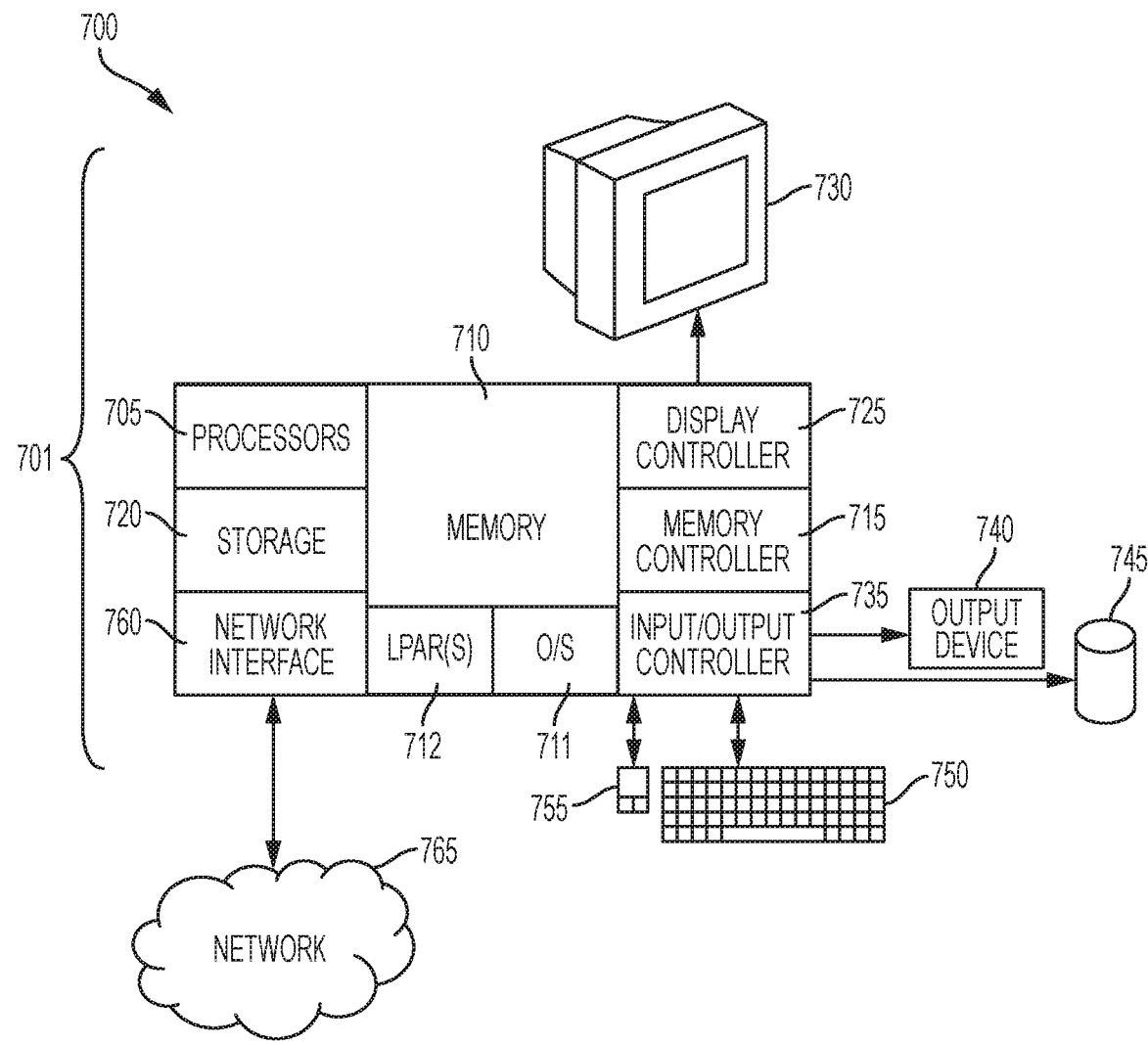
FIG. 7 depicts a block diagram of a computer system for resuming applications using pass-through servers and trace data in accordance with one or more embodiments.

Turning now to FIG. 7, a block diagram 700 of a computer system for resuming applications using pass-through servers and trace data is generally shown according to one or more embodiments. In accordance with one or more embodiments the processing described herein is performed by a processor located on a memory controller 715 and the memory devices are contained in a memory 710. The methods described herein can be implemented in hardware, software (e.g., firmware), or a combination thereof. In an exemplary embodiment, the methods described herein are implemented in hardware as part of the microprocessor of a special or general-purpose digital computer, such as a memory controller or mainframe computer.

In an exemplary embodiment, in terms of hardware architecture, as shown in FIG. 7, the computer 701 includes one or more processors 705, memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 735 may include a plurality of sub-channels configured to access the output devices 740 and 745. The sub-channels may include fiber-optic communications ports.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

The memory 710 may include multiple logical partitions (LPARs) 712, each running an instance of an operating system. The LPARs 712 may be managed by a hypervisor, which may be a program stored in memory 710 and executed by the processor 705.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute instructions stored within the memory 710, to communicate data to and from the memory 710, and to generally control operations of the computer 701 pursuant to the instructions.

Systems and methods according to this disclosure may be embodied, in whole or in part, in computer program products or in computing device 700, such as that illustrated in FIG. 7.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method comprising:
receiving, at a pass-through server executing in a replay mode, a request directed to a backend resource, the receiving from an application that is communicatively coupled to the pass-through server;
determining, by the pass-through server executing in the replay mode, a current execution phase of the application;
identifying, by the pass-through server executing in the replay mode, a response that corresponds to the request, the identifying including:
    forming a unique key that consists of an identifier of the current execution phase of the application and at least a subset of the request;
    accessing trace data, the trace data including a plurality of keys and corresponding responses recorded from multiple threads, the corresponding responses previously recorded in the trace data by the pass-through server executing in a recording mode based at least in part on responses by the backend resource to requests from the application at specified execution phases; and
    using the key to locate, in the trace data, the response corresponding to the request;
relaying, by the pass-through server executing in the replay mode, the identified response to the application; and
repeating the identifying and relaying using second trace data different than the trace data, the second trace data recorded based in least in part on responses by the backend resource to requests from the application at specified execution phases.

2. The method of claim 1, further comprising:
receiving, at the pass-through server executing in the recording mode, a request directed to the backend resource, the receiving from the application;
relaying, by the pass-through server executing in the recording mode, the request to the backend resource, the backend resource communicatively coupled to the pass-through server;
receiving, by the pass-through server executing in the recording mode, from the backend resource, the response to the request;
relaying, by the pass-through server executing in the recording mode, the response to the application;
determining, by the pass-through server executing in the recording mode, the current execution phase of the application; and
storing in the trace data, by the pass-through server executing in the recording mode, the identifier of the current execution phase of the application and at least a subset of the request as the key, and the response as the corresponding response.

3. The method of claim 1, wherein the determining a current execution phase of the application includes receiving the identifier of the current execution phase from the application.

4. The method of claim 1, wherein the application is communicatively coupled to a plurality of pass-through servers to communicate with a plurality of backend resources.

5. The method of claim 1, wherein the key is a unique key.

6. The method of claim 1, wherein prior to the receiving, the application is started at an intermediate state.

7. The method of claim 1, wherein the request is an application programming interface (API) call.

8. A system, comprising:
a memory having computer readable instructions; and
a processor for executing the computer readable instructions, the computer readable instructions including instructions for:
receiving, at a pass-through server executing in a replay mode, a request directed to a backend resource, the receiving from an application that is communicatively coupled to the pass-through server;
determining, by the pass-through server executing in the replay mode, a current execution phase of the application;
identifying, by the pass-through server executing in the replay mode, a response that corresponds to the request, the identifying including:
forming a unique key that consists of an identifier of the current execution phase of the application and at least a subset of the request;
accessing trace data, the trace data including a plurality of keys and corresponding responses recorded from multiple threads, the corresponding responses previously recorded in the trace by the pass-through server executing in a recording mode based at least in part on responses by the backend resource to requests from the application at specified execution phases; and
using the key to locate, in the trace data, the response corresponding to the request; and
relaying, by the pass-through server executing in the replay mode, the identified response to the application; and
repeating the identifying and relaying using second trace data different than the trace data, the second trace data recorded based in least in part on responses by the backend resource to requests from the application at specified execution phases.

9. The system of claim 8, wherein the computer readable instructions further include instructions for:
receiving, at the pass-through server executing in the recording mode, a request directed to the backend resource, the receiving from the application;
relaying, by the pass-through server executing in the recording mode, the request to the backend resource, the backend resource communicatively coupled to the pass-through server;
receiving, by the pass-through server executing in the recording mode, from the backend resource, the response to the request;
relaying, by the pass-through server executing in the recording mode, the response to the application;
determining, by the pass-through server executing in the recording mode, the current execution phase of the application; and storing in the trace data, by the pass-through server executing in the recording mode, the identifier of the current execution phase of the application and at least a subset of the request as the key, and the response as the corresponding response.

10. The system of claim 8, wherein the determining a current execution phase of the application includes receiving the identifier of the current execution phase from the application.

11. The system of claim 8, wherein the application is communicatively coupled to a plurality of pass-through servers to communicate with a plurality of backend resources.

12. The system of claim 8, wherein the key is a unique key.

13. The system of claim 8, wherein prior to the receiving, the application is started at an intermediate state.

14. The system of claim 8, wherein the request is an application programming interface (API) call.

15. A computer program product comprising a computer readable storage medium having program instructions embodied therewith, the program instructions executable by a processor to cause the processor to perform:
receiving, at a pass-through server executing in a replay mode, a request directed to a backend resource, the receiving from an application that is communicatively coupled to the pass-through server;
determining, by the pass-through server executing in the replay mode, a current execution phase of the application;
identifying, by the pass-through server executing in the replay mode, a response that corresponds to the request, the identifying including:
forming a unique key that consists of an identifier of the current execution phase of the application and at least a subset of the request;
accessing trace data, the trace data including a plurality of keys and corresponding responses recorded from multiple threads, the corresponding responses previously recorded in the trace by the pass-through server executing in a recording mode based at least in part on responses by the backend resource to requests from the application at specified execution phases; and
using the key to locate, in the trace data, the response corresponding to the request; and
relaying, by the pass-through server executing in the replay mode, the identified response to the application; and
repeating the identifying and relaying using second trace data different than the trace data, the second trace data recorded based in least in part on responses by the backend resource to requests from the application at specified execution phases.

16. The computer program product of claim 15, wherein the program instructions are further executable by the processor to cause the processor to perform:
receiving, at the pass-through server executing in the recording mode, a request directed to the backend resource, the receiving from the application;
relaying, by the pass-through server executing in the recording mode, the request to the backend resource, the backend resource communicatively coupled to the pass-through server;
receiving, by the pass-through server executing in the recording mode, from the backend resource, the response to the request;

relaying, by the pass-through server executing in the recording mode, the response to the application;

determining, by the pass-through server executing in the recording mode, the current execution phase of the application; and storing in the trace data, by the pass-through server executing in the recording mode, the identifier of the current execution phase of the application and at least a subset of the request as the key, and the response as the corresponding response.

17. The computer program product of claim 15, wherein the determining a current execution phase of the application includes receiving the identifier of the current execution phase from the application.

18. The computer program product of claim 15, wherein the application is communicatively coupled to a plurality of pass-through servers to communicate with a plurality of backend resources.

19. The computer program product of claim 15, wherein the key is a unique key.

20. The computer program product of claim 15, wherein prior to the receiving, the application is started at an intermediate state.

* * * * *